(12) United States Patent
Lee

(10) Patent No.: US 11,870,746 B2
(45) Date of Patent: Jan. 9, 2024

(54) METHOD FOR CHATTING MESSAGES BY TOPIC BASED ON SUBSCRIPTION CHANNEL REFERENCE IN SERVER AND USER DEVICE

(71) Applicants: Sang Kyu Lee, Anyang-si (KR); Jeen Hy Lee, Anyang-si (KR); Woo Jun Lee, Anyang-si (KR); Ha Rim Lee, Anyang-si (KR)

(72) Inventor: Sang Kyu Lee, Anyang-si (KR)

(73) Assignees: Sang Kyu Lee, Anyang-si (KR); Jeen Hy Lee, Anyang-si (KR); Woo Jun Lee, Anyang-si (KR); Ha Rim Lee, Anyang-si (KR)

( * ) Notice: Subject to any disclaimer, the term of this patent is extended or adjusted under 35 U.S.C. 154(b) by 0 days.

(21) Appl. No.: 17/711,584

(22) Filed: Apr. 1, 2022

(65) Prior Publication Data

US 2022/0321513 A1    Oct. 6, 2022

(30) Foreign Application Priority Data

Apr. 2, 2021    (KR) ........................ 10-2021-0043461

(51) Int. Cl.
| | | |
|---|---|---|
| G06F 15/16 | (2006.01) | |
| H04L 51/214 | (2022.01) | |
| H04L 51/04 | (2022.01) | |
| H04L 51/212 | (2022.01) | |
| H04L 51/216 | (2022.01) | |
| H04L 12/18 | (2006.01) | |

(52) U.S. Cl.
CPC ........ *H04L 51/214* (2022.05); *H04L 12/1813* (2013.01); *H04L 12/1822* (2013.01); *H04L 51/04* (2013.01); *H04L 51/212* (2022.05); *H04L 51/216* (2022.05)

(58) Field of Classification Search
CPC . H04L 12/1813; H04L 12/1822; H04L 51/04; H04L 51/212; H04L 51/214; H04L 51/216
USPC ........................................................ 709/206
See application file for complete search history.

(56) References Cited

U.S. PATENT DOCUMENTS

| | | | |
|---|---|---|---|
| 9,883,389 B2 | 1/2018 | Frederick et al. | |
| 2009/0233639 A1* | 9/2009 | Watson | H04L 51/58 455/519 |
| 2016/0285819 A1* | 9/2016 | Yadava | G06F 21/602 |
| 2018/0077542 A1* | 3/2018 | Xie | H04W 4/12 |

FOREIGN PATENT DOCUMENTS

| | | |
|---|---|---|
| KR | 10-2004-0102061 A | 12/2004 |
| KR | 10-2016-0075457 A | 6/2016 |
| KR | 10-2018-0072888 A | 7/2018 |
| WO | WO 2003/083703 A1 | 10/2003 |

* cited by examiner

*Primary Examiner* — Imad Hussain
(74) *Attorney, Agent, or Firm* — NSIP Law

(57) ABSTRACT

Provided is a method for chatting messages by topic based on subscription channel reference in a server. The method may include: receiving a message transmission request from a first user terminal corresponding to a first user to a second user terminal corresponding to a second user; extracting a subscription channel to be referred to by parsing the received message; reading a corresponding client handler with reference to a subscription channel stored in a subscription channel storage; and transmitting a message to the first and second user terminals through the read client handler.

13 Claims, 7 Drawing Sheets

METHOD FOR CHATTING MESSAGES BY TOPIC BASED ON SUBSCRIPTION CHANNEL REFERENCE IN SERVER AND USER DEVICE

CROSS-REFERENCE TO RELATED APPLICATION

This application claims priority to and the benefit of Korean Patent Application No. 10-2021-0043461, filed on Apr. 2, 2021, the disclosure of which is incorporated herein by reference in its entirety.

BACKGROUND

1. Technical Field

The present disclosure relates to a method for chatting messages by topic based on subscription channel reference in a server and a user terminal.

2. Related Art

Recently, as high-speed wireless network technologies and various types of smart terminals are spread, the use of chat services using them is increasing. The chat service is a service in which two or more users open a chat room on the basis of a network such as the Internet and exchange instant messages in realtime within the opened chat room.

On the other hand, a messenger has a critical weakness of message disconnection in terms of structure. The message disconnection means that the conversation topic is changed to another topic while the conversation is in progress on the timeline, and the previous conversation topic is not continued.

Such message disconnection is a structural problem that occurs when various topics of messages are mixed within one chat room, and the messages are mixed on the timeline, which makes it difficult to manage issues. That is, there is a problem in that it is necessary to search for ragged messages one by one in order to ascertain one issue on the timeline in the chat room.

Korean Patent Application Laid-Open No. 10-2016-0075457 (published on Jun. 29, 2016)

Creating a message based on a topic can solve a problem in which several topics are mixed in a chat room. However, it is not possible to continuously create a chat room as much as the structural issues of a chatting system. This is because, since subscription information continues to reside statically in a server memory, a server may be down due to the lack of resources when the subscription information is continuously generated.

SUMMARY

Various embodiments are directed to a method for chatting messages by topic based on subscription channel reference in a server and a user terminal, capable of solving the structural problem of a system with reference to a previously created subscription channel, creating a 'thread' based on a topic, and solving a message disconnection problem in which several topics are mixed in a chat room.

However, the problems to be solved by the present disclosure are not limited to the above-described problems, and other problems may be present.

In order to solve the above-described problems, a method for chatting messages by topic based on subscription channel reference in a server in accordance with a first aspect of the present disclosure may include: receiving a message transmission request from a first user terminal corresponding to a first user to a second user terminal corresponding to a second user; extracting a subscription channel to be referred to by parsing the received message; reading a corresponding client handler with reference to a subscription channel stored in a subscription channel storage; and transmitting a message to the first and second user terminals through the read client handler.

In some embodiments of the present disclosure, the message may be composed of a message header area including a topic and a subscription channel and a message thread area including content of the message.

In some embodiments of the present disclosure, the receiving of the message transmission request from the first user terminal corresponding to the first user to the second user terminal corresponding to the second user may include receiving a transmission request of a message composed of a message header area and a message thread area, the message header area including a topic of a message to be transmitted by the first user terminal and a subscription channel corresponding to the second user terminal, the message thread area including content of at least one message dependent on the message header area.

In some embodiments of the present disclosure, the extracting of the subscription channel by parsing the received message may include: extracting a subscription channel corresponding to the first user; and extracting a subscription channel corresponding to the second user.

In some embodiments of the present disclosure, the second user may correspond to a plurality of users, a plurality of groups, or at least one user and group, and the receiving of the message transmission request from the first user terminal corresponding to the first user to the second user terminal corresponding to the second user may include receiving a transmission request of a message composed of a message header area and a message thread area, the message header area including a topic of a message to be transmitted by the first user terminal and at least one of subscription channels corresponding to the plurality of users that are the second user, subscription channels corresponding to the plurality of groups, and subscription channels respectively corresponding to the user and group, the message thread area including content of at least one message dependent on the message header area.

In some embodiments of the present disclosure, the extracting of the subscription channel by parsing the received message may include: extracting a subscription channel corresponding to the first user; and extracting at least one corresponding subscription channel of the subscription channels corresponding to the plurality of users that are the second user, the subscription channels corresponding to the plurality of groups, and the subscription channels respectively corresponding to the user and group.

In some embodiments of the present disclosure, the transmitting of the message to the first and second user terminals through the read client handler may include transmitting the message to each of the subscription channels corresponding to the plurality of users, each of the subscription channels corresponding to the plurality of groups, or each of the subscription channels corresponding to the at least one user and group, through a corresponding client handler.

Furthermore, a server capable of providing message chatting by topic based on subscription channel reference in accordance with a second aspect of the present disclosure may include: a communication module; a memory; and a processor that executes a program stored in the memory, wherein when the communication module receives a message transmission request from a first user terminal corresponding to a first user to a second user terminal corresponding to a second user as the program is executed, the processor extracts a subscription channel to be referred to by parsing the received message, reads a corresponding client handler with reference to a subscription channel stored in a subscription channel storage, and then transmits a message to the first and second user terminals through the read client handler through the communication module.

Furthermore, a method for chatting messages by topic based on subscription channel reference in a user terminal in accordance with a third aspect of the present disclosure may include: generating a message composed of a message header area including a topic of a message and a subscription channel and a message thread area including content of the message; requesting a server to transmit the message to another user terminal corresponding to at least one another user and group; and providing the message through a subscription channel corresponding to the user terminal as the message is transmitted through a subscription channel corresponding to the another user terminal, wherein the message is parsed by the server, client handlers, which are to be referred to through a subscription channel storage and correspond to the user terminal and the another user terminal, are read, and the message is transmitted to the user terminal and the another user terminal through the read client handlers.

In some embodiments of the present disclosure, the generating of the message composed of the message header area including the topic of the message and the subscription channel and the message thread area including the content of the message may include generating a message composed of a message header area and a message thread area, the message header area including a topic of a message to be transmitted to the another user terminal and a subscription channel corresponding to the another user terminal, the message thread area including content of at least one message dependent on the message header area.

In some embodiments of the present disclosure, the another user may correspond to a plurality of users, a plurality of groups, or one or more users and groups, and the generating of the message composed of the message header area including the topic of the message and the subscription channel and the message thread area including the content of the message may include generating a message composed of a message header area and a message thread area, the message header area including a topic of a message to be transmitted to the another user terminal and at least one of subscription channels corresponding to the plurality of other users, subscription channels corresponding to the plurality of groups, and subscription channels respectively corresponding to the other users and groups, the message thread area including content of at least one message dependent on the message header area.

In some embodiments of the present disclosure, as the message is parsed by the server, a subscription channel, which is to be referred to through a subscription channel storage and corresponds to a user terminal, may be extracted, and at least one corresponding subscription channel of the subscription channels corresponding to the plurality of other users, the subscription channels corresponding to the plurality of groups, and the subscription channels respectively corresponding to the other users and groups may be extracted.

In some embodiments of the present disclosure, the message may be transmitted to each of the subscription channels corresponding to the plurality of other users, each of the subscription channels corresponding to the plurality of groups, or each of the subscription channels corresponding to the one or more users and groups, through a corresponding client handler.

In order to solve the above-described problems, a computer program in accordance with another aspect of the present disclosure is coupled to a computer as hardware, executes a program for the method for chatting messages by topic, and is stored in a computer readable recording medium.

The other details of the present disclosure are included in the detailed descriptions and the drawings.

In accordance with the above-described present disclosure, it is possible to reduce the load on a system and increase efficiency by reusing a previously created subscription channel. Furthermore, since data is generated based on a topic and a subscription channel group, a message accurately corresponding to a topic is circulated, so that data history and content of the message can be easily ascertained.

Furthermore, through the reuse of a subscription channel without creating a new subscription channel, a new subscription group can be created in infinite combinations as many as the number of all cases, so that various recipient groups for a message to be transmitted can be created. That is, when the number of subscription channels is N, combinations can be generated as many as $N^N$.

The effects of the present disclosure are not limited to the above-described effects, and the other effects which are not mentioned herein will be clearly understood from the following descriptions by those skilled in the art.

BRIEF DESCRIPTION OF THE DRAWINGS

FIG. 6 is a diagram illustrating the result of a one-to-one chatting status between users.

FIG. 7 is a diagram illustrating the result of a chatting status between group users.

FIG. 8 is a diagram illustrating the result of transmitting a message to both group and individual users.

DETAILED DESCRIPTION

Figure 1:
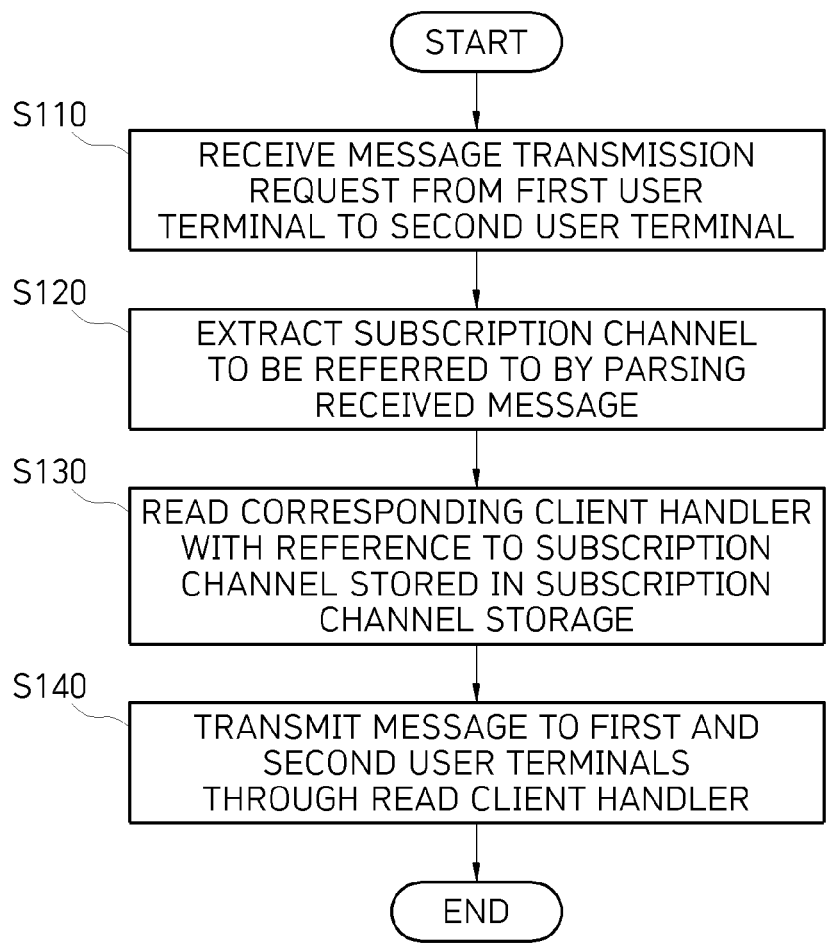
FIG. 1 is a flowchart for explaining a method for chatting messages by topic based on subscription channel reference in a server in accordance with an embodiment of the present disclosure.

The advantages and characteristics of the present disclosure and a method for achieving the advantages and characteristics will be clearly understood through embodiments to be described in detail with reference to the accompanying drawings. However, the present disclosure is not limited to the following embodiments, but may be implemented in various shapes different from each other, and the present embodiment is provided to bring the disclosure of the present disclosure to perfection and assist those skilled in the art to completely understand the scope of the present disclosure. Therefore, the scope of the present disclosure is defined only by claims.

Terms used in the present specification are used for describing exemplary embodiments while not limiting the present disclosure. The terms of a singular form in the present specification may include plural forms unless specifically mentioned. The meaning of 'comprise' and 'comprising' used in the specification does not exclude the presence or addition of one or more other components in addition to the mentioned components. Throughout the specification, like reference numerals represent the same components, and the term "and/or" includes each of mentioned components and one or more combinations thereof. Although terms "first" and "second" are used to describe various components, the components are not limited by the terms. The terms are used only to distinguish one element from another element. Therefore, a first component described below may be a second component within the technical idea of the present disclosure.

Unless defined differently, all terms (including technical and scientific terms) used in this specification may be used as meanings which are commonly understood by those skilled in the art to which the present disclosure pertains. Furthermore, terms which are defined in generally used dictionaries are not ideally or excessively construed unless clearly and specifically defined.

The present disclosure relates a method for chatting messages by topic based on subscription channel reference in a server 100 and user terminals 200 and 300.

A chat service creates a bundle unit between members through subscription, and this bundle unit becomes one subscription channel. The concept of subscription is a publicly known concept in computing. In general, a chat service associates a chat room with a subscription. For example, a one-to-one chat room indicates that the other party and I have subscribed to the chat room.

That is, the concept of subscription is an important technical concept as the final destination of data in transmitting chat data.

In a chat service, a chat room is a static component. For example, in the case of a one-to-one chat room, data is continuously accumulated as time passes. Furthermore, in the case of a one-to-many chat room, as the number of users who join in a chat room increases, it is not easy to remember all members.

In such a case, when one-to-many chat for members in a pre-configured chat room occurs, it is not easy to remember the pre-configured chat room, so members are invited again to create a new chat room. Furthermore, even though all the members in the chat room are remembered by recognizing the purpose of the chat room through the name of the chat room, a chat room is continuously created when there is a need for conversation with a new purpose.

Furthermore, various topics of conversations are exchanged within one chat room, and daily conversation may not a cause a big problem. However, in the case of a chart room within a business messenger, when various topics of messages are exchanged within one chat room, a message disconnection problem occurs and it takes an additional time to search for a disconnected message, which causes increased work inefficiency.

In order to solve such a problem, it is possible to consider continuously creating new chat rooms by topic. When a chat room is created by topic, a message 'thread' is created by topic, which makes it possible to prevent message fragmentation due to message disconnection and efficiently manage issues depending on the timeline.

However, when a chat room is created, subscription between members is created and a subscription channel is created as the result of the subscription. Since information on the subscription channel resides in a memory of a server, the number of subscription channels on the server increases when subscription is excessively created and the system is overloaded by the increased subscription channels.

That is, when a new chat room is continuously created and a subscription channel is continuously created, data is excessively occupied in the server system, which adversely affects the memory and performance.

That is, an embodiment of the present disclosure may solve the existing systematic problem, in which a subscription channel is continuously created, with reference to a previously created subscription channel, and simultaneously, may solve a problem, in which several topics are mixed, by creating a message under a recipient (or a reception group) created based on a title (topic) and separately creating a message space having a single title.

Hereinafter, a method for chatting messages by topic based on subscription channel reference in accordance with an embodiment of the present disclosure will be described with reference to FIG. 1 to FIG. 4.

FIG. 1 is a flowchart for explaining a method for chatting messages by topic based on subscription channel reference in the server 100 in accordance with an embodiment of the present disclosure.

First, the server 100 receives a message transmission request from a first user terminal 200 corresponding to a first user to a second user terminal 300 corresponding to a second user (S110).

The user terminals 200 and 300 are terminals that receive a chat service, which is provided by the server 100, through a subscription channel created through the chat service. For example, the chat service may be an instant message service. The instant message service is a service for relaying an instant message in realtime by using data communication through a network.

Meanwhile, in the present disclosure, the first user means a user who intends to transmit a message and a user terminal corresponding to the first user is referred to as the first user terminal 200. Furthermore, the second user means a user who intends to receive a message and a user terminal corresponding to the second user is referred to as the second user terminal 300. In such a case, the second user may be one user, a plurality of users, or a group of a plurality of users. Of course, each of the first user and the second user are not limited to a specific person, and the first user may be the second user or vice versa depending on the transmission/reception status of a message.

Next, the server 100 extracts a subscription channel to be referred to by parsing the received message (S120), and reads a corresponding client handler with reference to a subscription channel stored in a subscription channel storage (S130).

Figure 2:
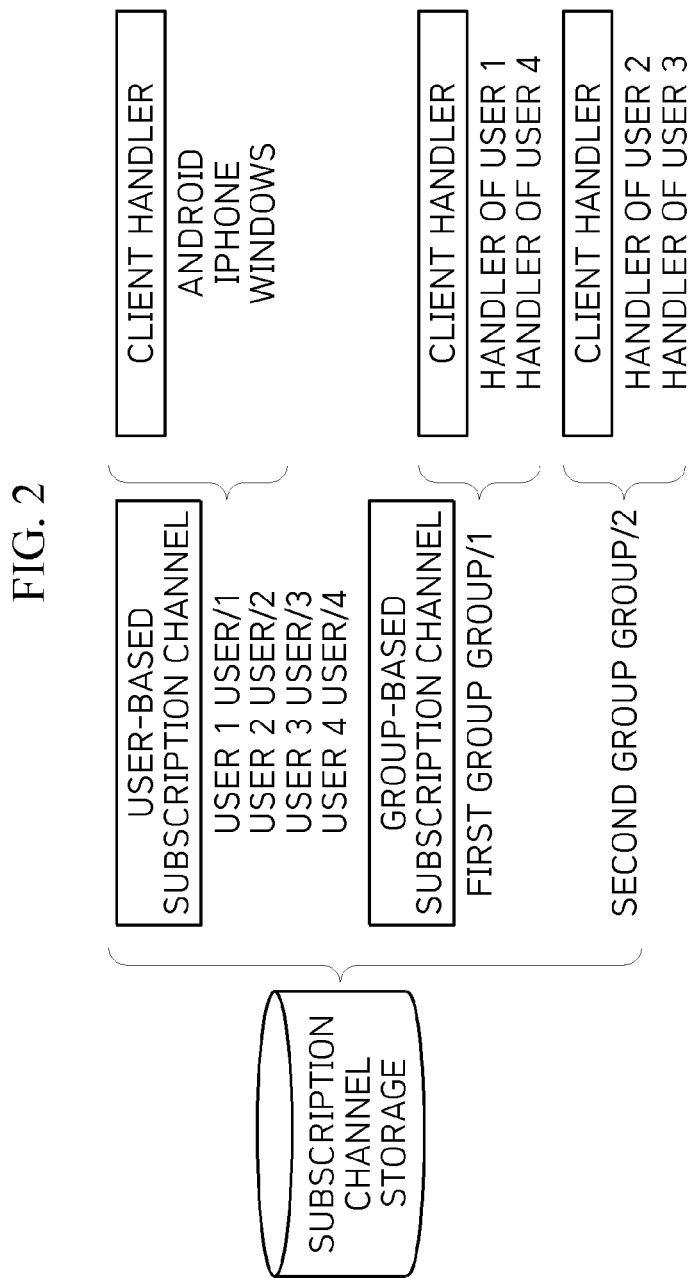
FIG. 2 is a diagram for explaining a subscription channel storage.

FIG. 2 is a diagram for explaining a subscription channel storage.

In an embodiment, when each user subscribes to a chat service, the server 100 processes the subscription of each user. Each user owns various user terminals (for example, mobile, desktop, web-based terminals, and the like), and the server 100 creates a user-based subscription channel for a bundle of these various user terminals.

Furthermore, the server 100 creates a subscription channel for a group that is a bundle of respective users. The group-based subscription channel refers to a chat room previously created at user requests. The group may be an organization unit or refers to a non-organization-based user group such as a project.

The subscription channel storage stores the user-based subscription channel and the group-based subscription channel, and stores the user-based subscription channel and a client handler corresponding to the user-based subscription channel in a key-value format. The client handler is in charge of an interface with an external device, and a handler exists for each accessing user terminal.

For example, a subscription channel User/1 of user 1 is stored as a key, and a client handler 'Android', 'iPhone', and 'Windows' corresponding to the subscription channel User/1 is stored as a value. In such a case, whenever a client handler of a user is newly used, the server 100 may store the client handler as a value. That is, when the user 1 first signs up for service with 'Android' and accesses the service, the server 100 stores the subscription channel User/1 of the user 1 and the 'Android' as a key-value. Then, when the user 1 accesses the service again with 'iPhone', the server 100 adds 'iPhone' to the client handler.

When user 2 transmits a message to the user 1, the message is transmitted to each of 'Android', 'iPhone', and 'Windows'-based user terminals through the client handler of the user 1.

Furthermore, the subscription channel storage stores the group-based subscription channel and client handlers, which correspond to users included in a group, in a key-value format.

For example, a first group is a chat room in which the user 1 and user 4 are joining, a second group is a chat room in which the user 2 and user 3 are joining, and subscription channels Group/1 and Group/2 corresponding to the first group and the second group are stored in the subscription channel storage as keys. Furthermore, the server 100 stores and manages the client handler used by the user 1 and a client handler used by the user 4 as values corresponding to the subscription channel Group/1 of the first group.

Figure 3:
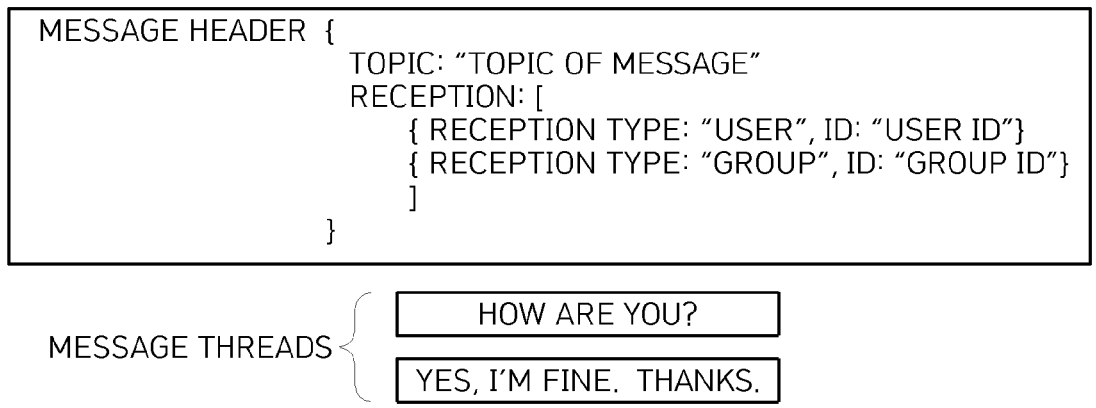
FIG. 3 is a diagram for explaining the structure of a message in an embodiment of the present disclosure.

FIG. 3 is a diagram for explaining the structure of a message in an embodiment of the present disclosure.

In an embodiment, a message in the present disclosure is created by including a header area Header and a thread area Thread. The header area is composed of a topic, which is a title of the message, and a subscription channel. The thread area includes the content of the message.

According to such a structure of the message, the first user adds the topic of the message and an ID of the second user (individual user or group), and when the content of the message is written, the first user terminal 200 transmits, to the server 100, a request of transmitting the message to the second user terminal 300.

Accordingly, the server 100 receives a transmission request of a message composed of a message header area and a message thread area, the message header area including the topic of a message to be transmitted by the first user terminal 200 and a subscription channel corresponding to the second user terminal 300, the message thread area including the content of at least one message dependent on the message header area.

The present disclosure is characterized in that the message thread area is dependent on the message header area, which means that when a message is created based on a header of the message, the message dependent on the header is continuously created. That is, since the message header area includes the topic of the message, the content of the message is transmitted and managed by matching the topic.

Upon receiving such a message transmission request, the server 100 extracts a subscription channel corresponding to the first user by parsing the received message, and extracts a subscription channel corresponding to the second user.

Then, the server 100 reads client handlers corresponding to the first and second user terminals 200 and 300 with reference to the subscription channel stored in the subscription channel storage, and then transmits the message to the corresponding first and second user terminals 200 and 300 through the read client handlers (S140).

On the other hand, as described above, a general chat service has a problem in that message disconnection occurs as various topics are mixed in one chat room. Therefore, when a new chat room is opened by topic in order to solve the message disconnection, a new subscription channel is created, which leads to overload on the system.

On the other hand, an embodiment of the present disclosure has an advantage in that the above-described problem can be solved by using a previously created subscription channel.

Specifically, when the second user is a plurality of users, a plurality of groups, or at least one user and group, the first user adds the IDs of the plurality of users, the ID corresponding to the plurality of groups, or the ID of the user and group to the second user together with the topic of the message. When the content of the message is written, the first user terminal 200 transmits, to the server 100, a request of transmitting the message to the second user terminal 300.

Accordingly, the server 100 receives a transmission request of a message composed of a message header area and a message thread area, the message header area including a topic of a message to be transmitted by the first user terminal 200 and at least one of subscription channels corresponding to the plurality of second user terminals 300, that is, subscription channels corresponding to the plurality of users, subscription channels corresponding to the plurality of groups, and subscription channels respectively corresponding to the user and the group, the message thread area including the content of at least one message dependent on the message header area.

Thereafter, upon receiving the message transmission request, the server 100 extracts a subscription channel corresponding to the first user by parsing the received message, and extracts at least one corresponding subscription channel of the subscription channels corresponding to the plurality of users that are the second user, the subscription channels corresponding to the plurality of groups, and the subscription channels respectively corresponding to the user and the group.

Then, the server 100 reads client handlers corresponding to the first and second user terminals 200 and 300 with reference to the subscription channel stored in the subscription channel storage, and then transmits the message to the corresponding first and second user terminals 200 and 300 through the read client handlers (S140).

As described above, an embodiment of the present disclosure may create a message topic by using an existing subscription channel, and thus need not create a subscription channel again with a new combination. Thus, the embodiment of the present disclosure may prevent a new subscription channel from being excessively created, thereby reducing the load on the system. Furthermore, the embodiment of the present disclosure may create a message based on a topic, thereby preventing messages unrelated to a topic from being loaded in a chat room.

Figure 4:
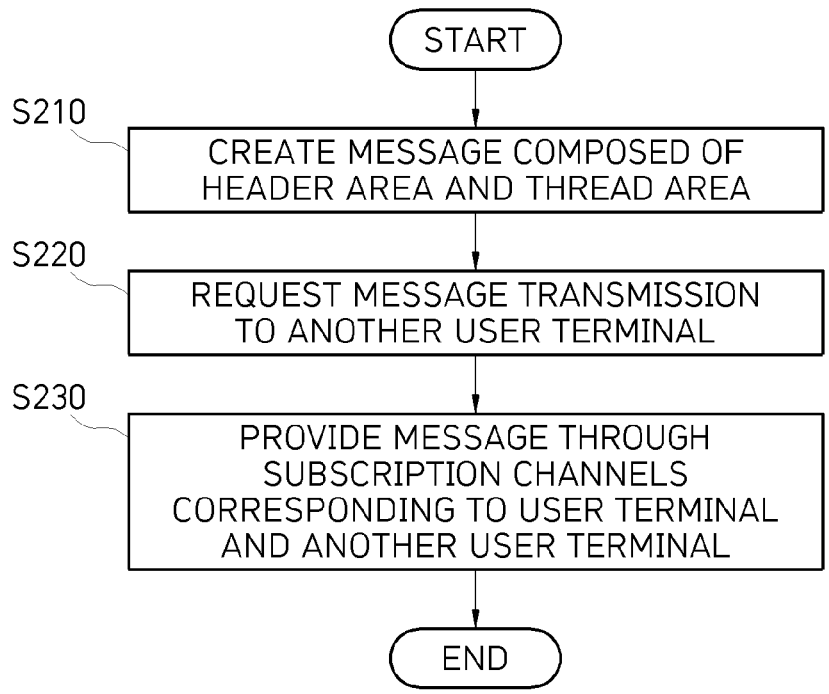
FIG. 4 is a flowchart for explaining a method for chatting messages by topic based on subscription channel reference in a user terminal in accordance with an embodiment of the present disclosure.

FIG. 4 is a flowchart for explaining a method for chatting messages by topic based on subscription channel reference in a user terminal in accordance with an embodiment of the present disclosure. In FIG. 4, a description overlapping that of FIG. 1 to FIG. 3 will be omitted, and the above-described technical features are included as they are.

First, the user terminal 200 creates a message composed of a message header area including the topic of a message and a subscription channel and a message thread area including the content of the message (S210).

Next, the user terminal 200 requests the server 100 to transmit a message to another user terminal 300 corresponding to at least one another user and group (S220), and as the message is transmitted to the another user terminal 300, the message is provided through subscription channels corresponding to the user terminal 200 and the another user terminal 300, respectively (S230).

The message is parsed by the server 100, client handlers, which are to be referred to through the subscription channel storage and correspond to the user terminal 200 and the another user terminal 300, are read, and the message is transmitted to the user terminal 200 and the another user terminal 300 through the read client handlers.

In the above-described description, S110, S120, S130 S140, S210, S220, and S230 may be further divided into additional steps or combined into fewer steps according to an implementation example of the present disclosure. Furthermore, some steps may also be omitted as needed or an order between steps may also be changed.

Figure 5:
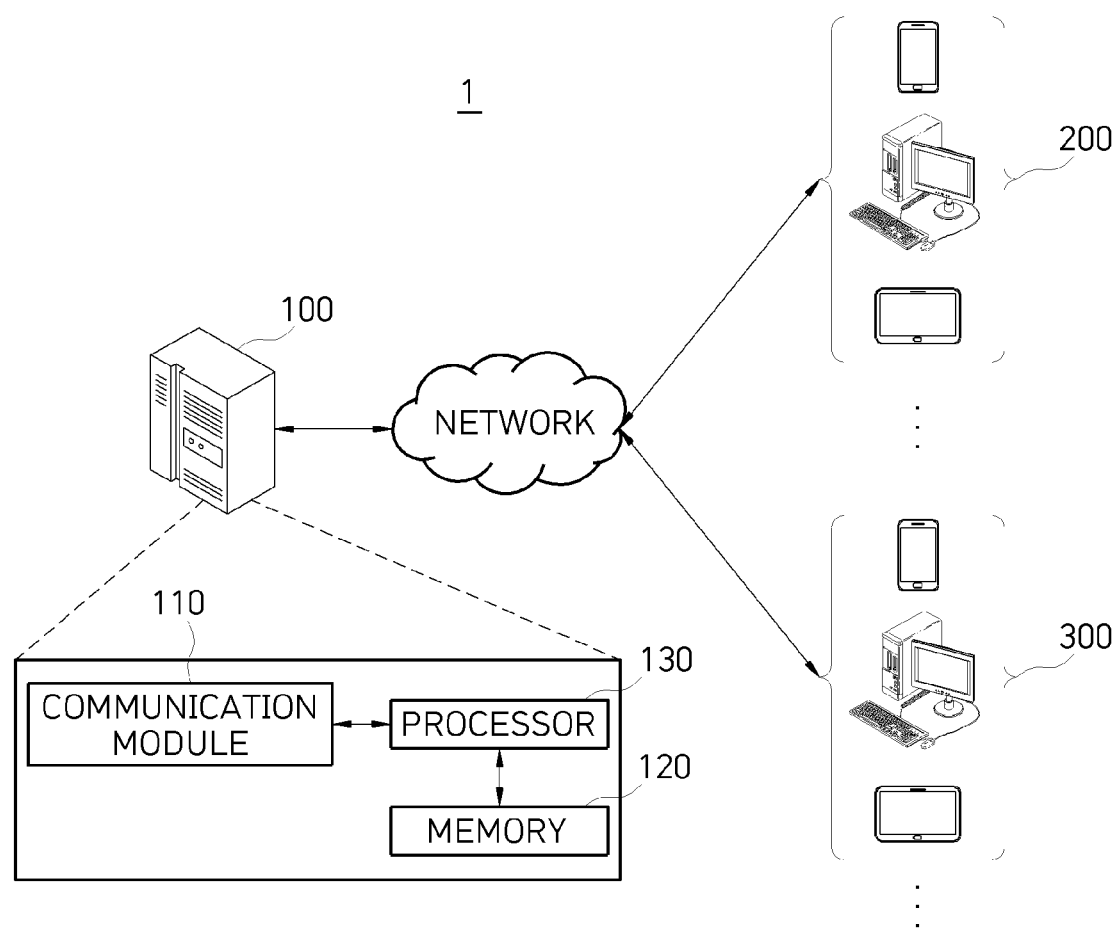
FIG. 5 is a diagram for explaining a system for providing message chatting by topic based on subscription channel reference in accordance with an embodiment of the present disclosure.

FIG. 5 is a diagram for explaining a system 1 for providing message chatting by topic based on subscription channel reference in accordance with an embodiment of the present disclosure.

The system 1 for providing message chatting by topic in accordance with an embodiment of the present disclosure includes the server 100 and the user terminals 200 and 300.

The server 100 includes a communication module 110, a memory 120, and a processor 130.

The communication module 110 transfers and provides messages of the first user terminal 200 and the second user terminal 300, and transmits/receives other necessary data.

The memory 120 stores a subscription channel storage and a program for providing message chatting by topic based on subscription channel reference, and the processor 130 executes the program stored in the memory 120.

When the communication module 110 receives a message transmission request from the first user terminal 200 corresponding to a first user to the second user terminal 300 corresponding to a second user is received as the processor 130 executes the program stored in the memory 120, the processor 130 extracts a subscription channel to be referred to by parsing the received message.

Then, the processor 130 reads a corresponding client handler with reference to a subscription channel stored in the subscription channel storage, and then transmits a message to the first and second user terminals 200 and 300 through the read client handler through the communication module 110.

On the other hand, even though there are other omitted contents, the contents of FIG. 1 to FIG. 4 are applied to the system 1 for providing message chatting by topic in FIG. 5.

Hereinafter, an example, in which an embodiment of the present disclosure is implemented, will be described with reference to FIG. 6 to FIG. 8.

Figure 6:
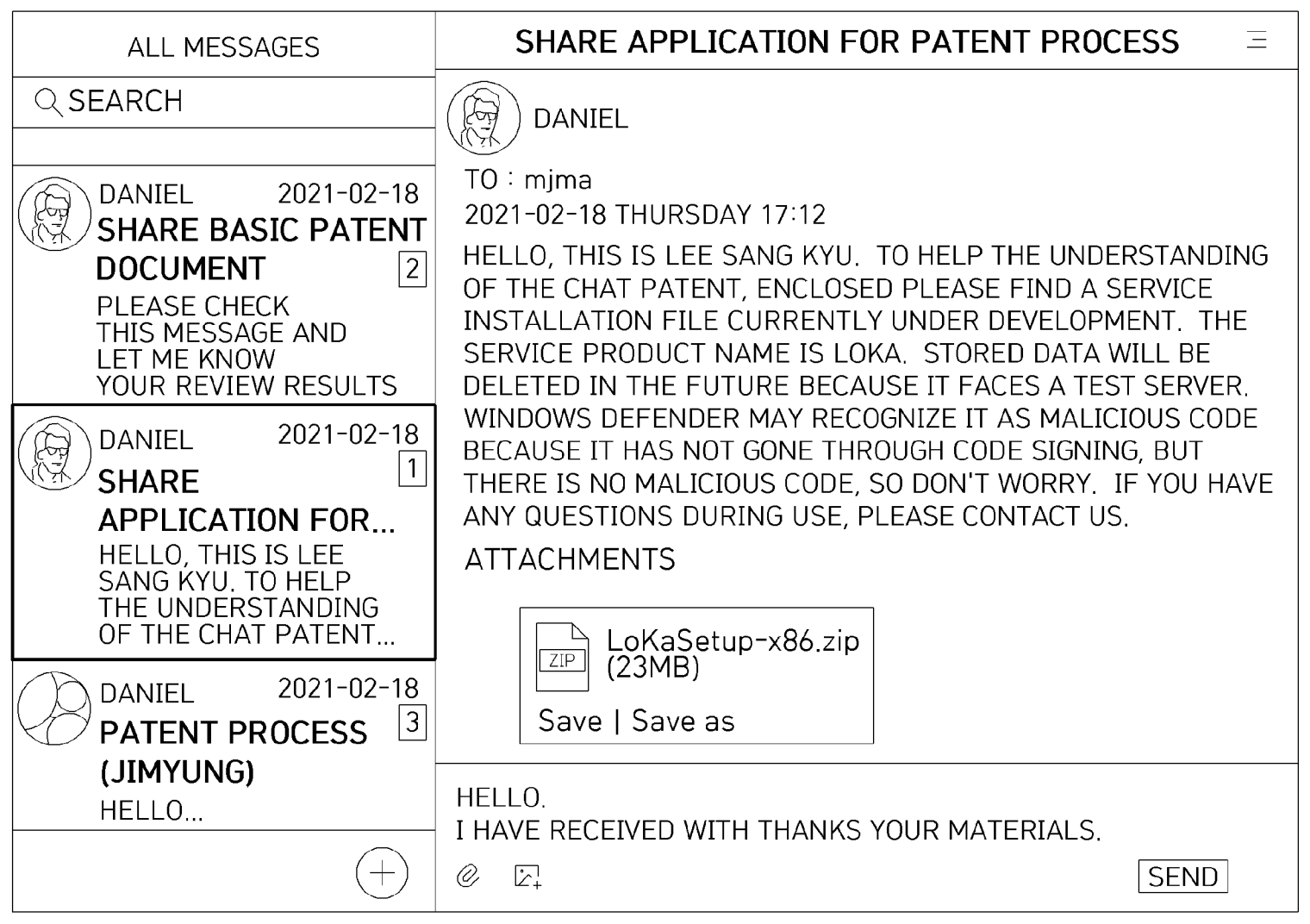

FIG. 6 is a diagram illustrating the result of a one-to-one chatting status between users, and illustrates the result that a first user "Daniel", who is a sender, transmits a message to a second user "mjma" who is a recipient. When the first user writes a message having the topic "Share the application for patent process" and sends the message by designating individual "mjma" as a receiving target, the server 100 extracts a subscription channel to be referred to by parsing the received message, reads a corresponding client handler with reference to a subscription channel stored in the subscription channel storage, and then transmits the message to the first and second user terminals 200 and 300.

As a consequence, on each predetermined screen of the first user terminal 200 and the second user terminal 300, the title of the transmitted message is displayed at the top thereof and the content of the message is displayed below the title of the message. In the lower area of the screen, a separate area where the first and second users may input a message is generated, and messages may be respectively input through the separate area.

Figure 7:
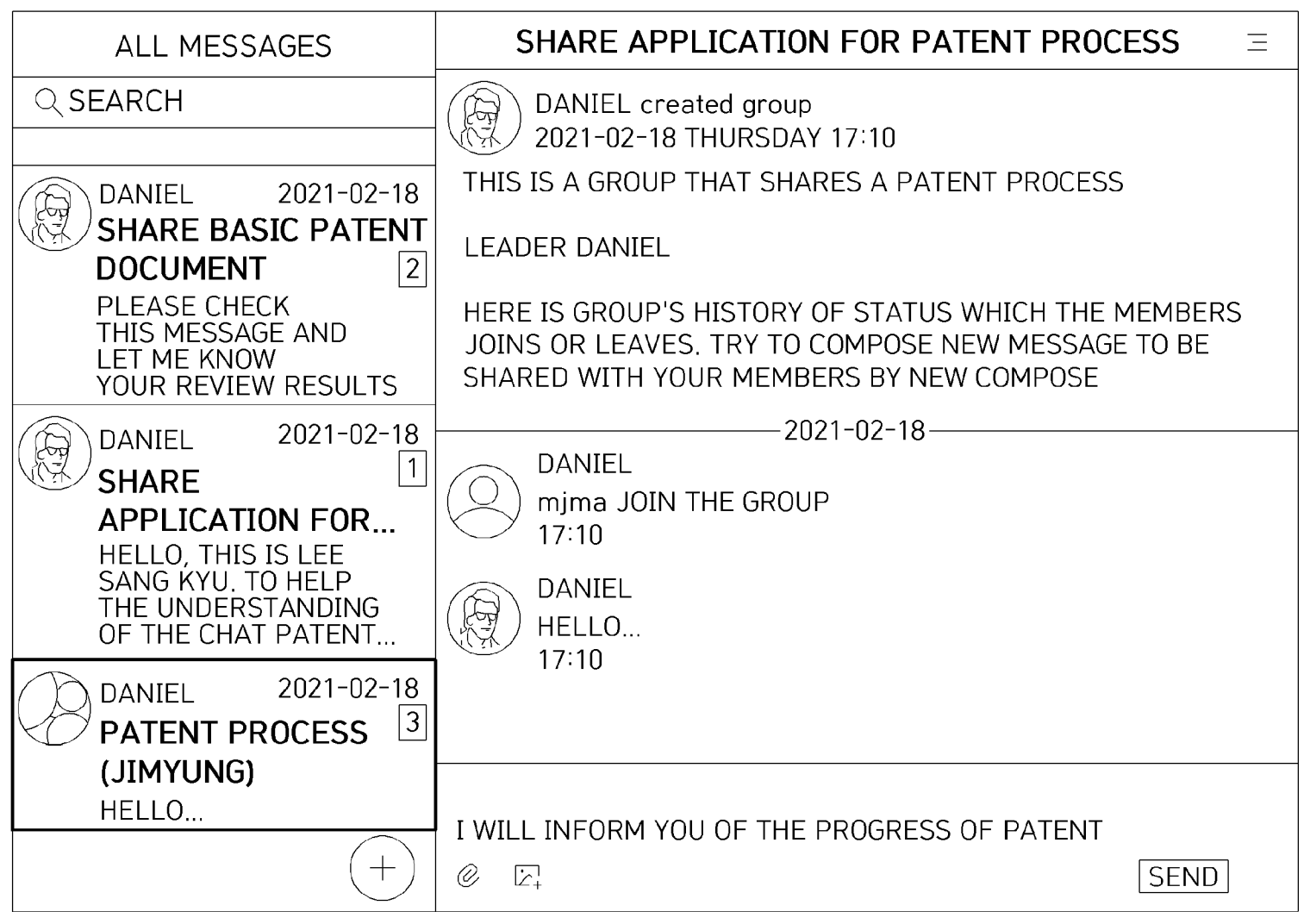

FIG. 7 is a diagram illustrating the result of a chatting status between group users, and illustrates that the first user "Daniel" writes "Patent process (JIMYUNG)" as a title, designates "mjma" as each user who is to join in a group, and then inputs the content of a message. In such a case, the group may include a plurality of users further designated as recipients, and FIG. 7 illustrates that a group includes two designated users for convenience of explanation.

Upon receiving a message including the title and the group recipients from the first user, the server 100 extracts a subscription channel to be referred to by parsing the message, reads a client handler corresponding to the subscription channel from the subscription channel storage, and then transmits the message to user terminals in the group.

As a consequence, on each predetermined screen of the first and second user terminals 200 and 300, the title of the transmitted message is displayed at the top thereof and the content of the message is displayed below the title. Accordingly, each user included in the group may exchange a message related to the title.

Figure 8:
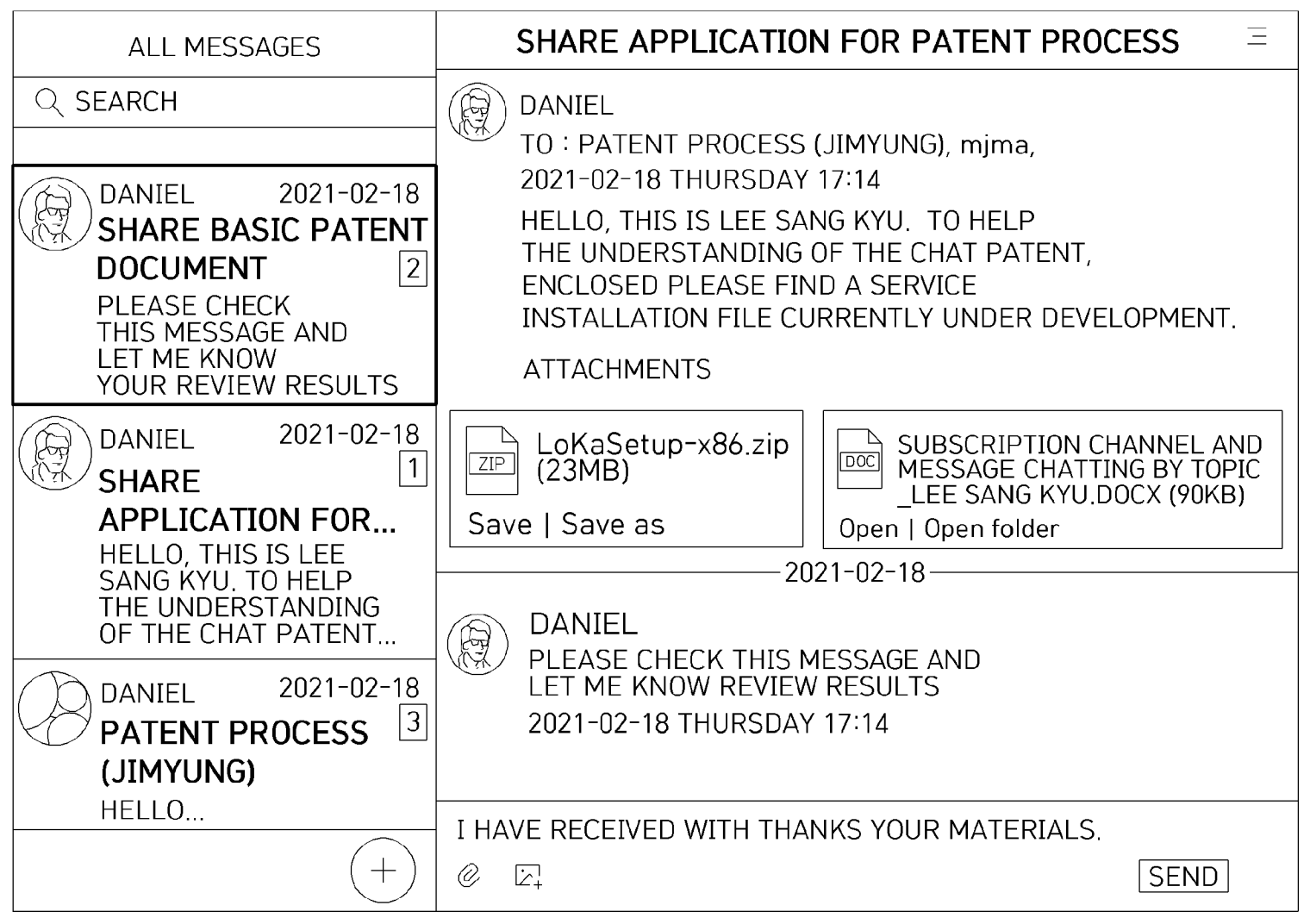

FIG. 8 is a diagram illustrating the result of transmitting a message to both group and individual users, and illustrates that the first user "Daniel" writes a message having the title "Share the basic patent document" and transmits the message by designating the group "Patent process (JIMYUNG)" and the individual user "mjma" as recipients.

Upon receiving a transmission request of the message, the server 100 extracts a subscription channel to be referred to by parsing the message, extracts subscription channels of the individual users "mjma" and "Daniel", which have been created at the time of subscription, respectively, and extracts a subscription channel corresponding to the group "Patent process (JIMYUNG)" created in the process of FIG. 7.

Thereafter, the server 100 extracts client handlers corresponding to the extracted subscription channels from the subscription channel storage, and then transmits each message to the group and the client handlers of the individual users.

Accordingly, individual users and users included in the group may each receive a message including the title and content, and the group and individual users may each exchange a message corresponding to the title through its own terminals.

In a case where the first group (Patent process (JIMYUNG)) and the second group (Patent process (company)) have already been created, when an individual user sends a message with a new title to the first and second groups and 10 members, a new subscription channel needs to be created because a new chat room is created in the related art. When the number of chat rooms to be newly opened increases, the server becomes overloaded.

On the other hand, in accordance with an embodiment of the present disclosure, it is only necessary to refer to two previously created group subscription channels and subscription channels of 10 members without creating a new subscription channel. Thus, even though a new chat room is created, there is no need to create a new subscription channel, which makes it possible to minimize the load on resources.

The above-described embodiment of the present disclosure may be implemented as a program (or application) and stored in a medium, so as to be executed through a computer as hardware which is coupled thereto.

The above-described program may include codes written by a computer language such as C, C++, JAVA, Ruby or machine language, which can be read by a processor (CPU) of the computer through a device interface of the computer, in order to execute the above-described method which is implemented as a program read by the computer. Such codes may include a functional code related to a function defining functions required for executing the above-described methods, and include an execution procedure-related control code required for the processor of the computer to execute the functions according to a predetermined procedure. Furthermore, such codes may further include additional information required for the processor of the computer to execute the functions or a memory reference-related code indicating the position (address) of an internal or external memory of the computer, where a medium needs to be referred to. Furthermore, when the processor of the computer needs to communicate with another remote computer or server in order to execute the functions, the codes may further include communication-related codes indicating how to communicate with another remote computer or server by using a communication module of the computer and which information or media to transmit during communication.

The stored medium does not indicate a medium such as a register, cache or memory, which stores data for a short moment, but indicates a medium which semi-permanently stores data and can be read by a device. Specifically, examples of the storage medium include a ROM, RAM, CD-ROM, magnetic tape, floppy disk, optical data storage device and the like, but the present disclosure is not limited thereto. That is, the program may be stored in various recording media on various servers which the computer can access or various recording media of a user's computer. Furthermore, the media may store codes which can be distributed in computer systems connected through a network, and read by computers in a distributed manner.

The descriptions of the present disclosure are only examples, and those skilled in the art to which the present disclosure pertains will understand that the present disclosure can be easily modified into other specific forms without changing the technical spirit or essential features of the present disclosure. Therefore, it should be understood that the above-described embodiments are only illustrative in all aspects and are not limitative. For example, components described in a singular form may be distributed and embodied. Similarly, distributed components may be embodied in a coupled form.

The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. A method for chatting messages by topic based on subscription channel reference in a server, the method comprising:
   receiving a message transmission request from a first user terminal corresponding to a first user to a second user terminal corresponding to a second user;
   extracting a subscription channel to be referred to by parsing the received message;
   reading a corresponding client handler with reference to the subscription channel stored in a subscription channel storage, wherein the client handler manages an interface with an external device; and
   transmitting a message to the first and second user terminals through the read client handler.

2. The method of claim 1, wherein the message is composed of a message header area including a topic and a subscription channel and a message thread area including content of the message.

3. The method of claim 2, wherein the receiving of the message transmission request from the first user terminal corresponding to the first user to the second user terminal corresponding to the second user comprises:
   receiving a transmission request of a message composed of a message header area and a message thread area, the message header area including a topic of a message to be transmitted by the first user terminal and a subscription channel corresponding to the second user terminal, the message thread area including content of at least one message dependent on the message header area.

4. The method of claim 3, wherein the extracting of the subscription channel by parsing the received message comprises:
   extracting a subscription channel corresponding to the first user; and
   extracting a subscription channel corresponding to the second user.

5. The method of claim 2, wherein the second user corresponds to a plurality of users, a plurality of groups, or at least one user and group, and
   the receiving of the message transmission request from the first user terminal corresponding to the first user to the second user terminal corresponding to the second user comprises:
   receiving a transmission request of a message composed of a message header area and a message thread area, the message header area including a topic of a message to be transmitted by the first user terminal and at least one of subscription channels corresponding to the plurality of users that are the second user, subscription channels corresponding to the plurality of groups, and subscription channels respectively corresponding to the user and group, the message thread area including content of at least one message dependent on the message header area.

6. The method of claim 5, wherein the extracting of the subscription channel by parsing the received message comprises:
   extracting a subscription channel corresponding to the first user; and
   extracting at least one corresponding subscription channel of the subscription channels corresponding to the plurality of users that are the second user, the subscription channels corresponding to the plurality of groups, and the subscription channels respectively corresponding to the user and group.

7. The method of claim 6, wherein the transmitting of the message to the first and second user terminals through the read client handler comprises:

transmitting the message to each of the subscription channels corresponding to the plurality of users, each of the subscription channels corresponding to the plurality of groups, or each of the subscription channels corresponding to the at least one user and group, through a corresponding client handler.

8. A server for providing message chatting by topic based on subscription channel reference, the server comprising:

a communication module;

a memory; and a processor configured to execute a program stored in the memory, wherein when the communication module receives a message transmission request from a first user terminal corresponding to a first user to a second user terminal corresponding to a second user as the processor executes the program, the processor extracts a subscription channel to be referred to by parsing the received message, reads a corresponding client handler with reference to the subscription channel stored in a subscription channel storage, wherein the client handler manages an interface with an external device, and transmits a message to the first and second user terminals through the read client handler through the communication module.

9. A method for chatting messages by topic based on subscription channel reference in a user terminal, the method comprising:

generating a message composed of a message header area including a topic of a message and a subscription channel and a message thread area including content of the message;

requesting a server to transmit the message to another user terminal corresponding to at least one another user and group; and providing the message through a subscription channel corresponding to the user terminal as the message is transmitted through a subscription channel corresponding to the another user terminal, wherein the message is parsed by the server, client handlers, which are to be referred to through a subscription channel storage and correspond to the user terminal and the another user terminal, are read, and the message is transmitted to the user terminal and the another user terminal through the read client handlers.

10. The method of claim 9, wherein the generating of the message composed of the message header area including the topic of the message and the subscription channel and the message thread area including the content of the message comprises:

generating a message composed of a message header area and a message thread area, the message header area including a topic of a message to be transmitted to the another user terminal and a subscription channel corresponding to the another user terminal, the message thread area including content of at least one message dependent on the message header area.

11. The method of claim 9, wherein the another user corresponds to a plurality of users, a plurality of groups, or one or more user and group, and the generating of the message composed of the message header area including the topic of the message and the subscription channel and the message thread area including the content of the message comprises:

generating a message composed of a message header area and a message thread area, the message header area including a topic of a message to be transmitted to the another user terminal and at least one of subscription channels corresponding to the plurality of other users, subscription channels corresponding to the plurality of groups, and subscription channels respectively corresponding to the other users and groups, the message thread area including content of at least one message dependent on the message header area.

12. The method of claim 11, wherein as the message is parsed by the server, a subscription channel, which is to be referred to through a subscription channel storage and corresponds to a user terminal, is extracted, and at least one corresponding subscription channel of the subscription channels corresponding to the plurality of other users, the subscription channels corresponding to the plurality of groups, and the subscription channels respectively corresponding to the other users and groups is extracted.

13. The method of claim 12, wherein the message is transmitted to each of the subscription channels corresponding to the plurality of other users, each of the subscription channels corresponding to the plurality of groups, or each of the subscription channels corresponding to the one or more users and groups, through a corresponding client handler.

\* \* \* \* \*